United States Patent [19]

Kim et al.

[11] 4,180,491

[45] Dec. 25, 1979

[54] NONIONIC POLYURETHANE THICKENER WITH SURFACTANT COTHICKENER AND ORGANIC DILUENT, CLEAR CONCENTRATES, AQUEOUS PRINT PASTES, COLORING COMPOSITIONS, METHODS OF MAKING AND PRINTING

[75] Inventors: Samuel S. Kim, Huntingdon Valley; Travis E. Stevens, Ambler, both of Pa.

[73] Assignee: Rohm and Haas Company, Philadelphia, Pa.

[21] Appl. No.: 746,449

[22] Filed: Dec. 1, 1976

[51] Int. Cl.$^2$ ............ C08L 75/08; C09B 67/00; C09D 11/10

[52] U.S. Cl. .................. 260/29.2 TN; 8/1 R; 8/62; 260/37 N

[58] Field of Search .......... 260/29.2 TN; 8/1 R

[56] References Cited

U.S. PATENT DOCUMENTS

| 2,275,991 | 3/1942 | Powers et al. | 260/17.4 ST |
|---|---|---|---|
| 2,886,474 | 5/1959 | Kine et al. | 260/17 A |
| 2,948,691 | 8/1960 | Windemuth et al. | 260/29.2 TN |
| 3,647,735 | 3/1972 | Brodnyan | 260/29.4 UA |
| 3,988,278 | 10/1976 | Bartizal | 260/29.2 TN |
| 4,079,028 | 3/1978 | Emmons et al. | 260/29.2 TN |

FOREIGN PATENT DOCUMENTS 822504 10/1959 United Kingdom .
1069735 5/1967 United Kingdom .

*Primary Examiner*—Murray Tillman
*Assistant Examiner*—Arthur H. Koeckert
*Attorney, Agent, or Firm*—Patrick C. Baker

[57] ABSTRACT

Print pastes are thickened by a thickener concentrate containing about 5-50% by weight of a nonionic polyurethane having a molecular weight of at least 10,000 and at least 3 hydrophobic branching groups linked through hydrophilic polyether segments, a surfactant in an amount providing a thickener to surfactant weight ratio of about 1:0.01 to about 1:10, about 5-35% by weight of a non-aqueous organic diluent, and 0-65% by weight of water.

16 Claims, No Drawings

NONIONIC POLYURETHANE THICKENER WITH SURFACTANT COTHICKENER AND ORGANIC DILUENT, CLEAR CONCENTRATES, AQUEOUS PRINT PASTES, COLORING COMPOSITIONS, METHODS OF MAKING AND PRINTING

BACKGROUND OF THE INVENTION

This invention relates to compositions for the coloring of fibrous articles, and more particularly to thickener concentrates for use in print pastes.

Pigment compositions for the printing of fibrous articles commonly contain thickening agents in order to assist in dispersion of the pigment, spreading of the composition over the substrate under operating shear conditions, and binding of the pigment to the fibrous article. It is common practice in the formulation of such pastes to first prepare a concentrate of the thickener, known in the art as a "clear concentrate". Generally, a clear concentrate is an aqueous mixture, such as a dispersion or solution, containing a high concentration of the thickener, on the order of about 20-50% by weight. Because conventional thickeners at such high concentration form highly viscous mixtures which cannot be easily handled, the next step is to dilute the clear concentrate to form a "cut clear". This is a composition containing about 5% by weight of the clear concentrate, the balance being water. In the next step of formulating the paste, a pigment concentrate (known in the art as a "presscake dispersion") is mixed with the cut clear and water in such proportions as to provide a viscosity of about 1,000–8,000 cps. A common presscake dispersion contains about 35% by weight of pigment, about 12% by weight of dispersants for the pigment, and the balance water. The resulting composition is known as a "color concentrate" and conventionally contains about 50% by weight of the presscake dispersion, about 10% by weight of the clear concentrate and the balance water. For use as a pigment printing paste, a resinous binder is then mixed with the color concentrate and the mixture is diluted to a level effective to obtain a viscosity increase suitable for providing good printability.

In the case of print pastes other than pigment print pastes, the color concentrate is formed with a suitable water soluble dye rather than with a presscake dispersion, and the print paste is prepared merely by diluting the color concentrate. A resinous binder is not required.

It will be evident from the foregoing that the thickener must be carefully selected from the standpoint of its viscosity in water. It must be present in the color concentrate at levels effective for assisting in the dispersion of the dye but without inducing so high a viscosity that the composition becomes unmanageable in terms of mixability and rheological properties. Accordingly, an essential requirement for any thickener is that it have a controllable viscosity, i.e., the viscosity which it imparts to a formulation may be increased or decreased predictably upon the addition or subtraction of water.

A wide variety of thickeners are known. These include natural gums such as guar and locust bean extract, certain polyelectrolyte resins, carboxyvinyl polymers, and copolymers containing hydrophobic groups based upon stearic acid and hydrophilic linkages based upon poly(oxyethylene) chains. All of the known thickeners have deficiencies. These include undue sensitivity of the ionic thickener types to pH and salts, poor thickening efficiency, handling and formulating difficulty due to too high initial viscosity or too long a duration for full viscosity development, the tendency of some thickeners to stiffen fabrics or to cause "haloing" (diffusion of color patterns) or "crocking" (rubbing off of color), and other aspects of poor viscosity control such as lack of viscosity recovery after the high shear which accompanies the screening of a pigment printing paste. Even those thickeners which are non-ionic, and therefore not normally subject to changes in pH or the presence of electrolytes, have been deficient in storage stability, exhibiting substantial losses in viscosity due to hydrolysis on standing.

SUMMARY

A thickener composition has now been found which overcomes the aforementioned deficiencies of known thickeners and most nearly realizes the ideal requirements for thickeners in dye print paste formulations. In this specification the terms "dye" and "dyestuff" are used interchangeably to mean any coloring material useful for coloring natural or synthetic fibers or blends thereof. In one aspect, the invention is a clear concentrate composition for use in dye pastes, comprising a mixture of about 20-50% by weight of a non-ionic polyurethane, a surfactant in an amount providing a polyurethane to surfactant weight ratio of about 1:0.01 to about 1:10, about 5-35% by weight of a non-aqueous, inert organic diluent, and 0 to about 65% by weight of water. In another aspect, the invention provides coloring compositions based on dye print pastes containing as thickeners a nonionic polyurethane and a surfactant. In still other aspects, the invention includes methods of preparing dye print pastes, and using such pastes in the printing of fibrous articles such as textiles and carpets.

In the compositions of the invention the nonionic polyurethane is the primary thickener and the surfactant acts to vastly increase the viscosity provided by the polyurethane. For this reason, the surfactant may be termed a "co-thickener". The polyurethane is characterized by a molecular weight of at least 10,000 and has at least three hydrophobic branching groups, such groups together containing a total of at least 20 carbon atoms and being linked through hydrophilic polyether segments of at least 1500 molecular weight each.

It is believed that the thickener composition operates by hydrophobic molecular association rather than by the molecular expansion of ionic thickeners. Such molecular expansion is believed due to repulsive charge interactions which occur upon neutralization of ionic thickener types. The nonionic character of the polyurethane renders it insensitive to pH and changing electrolyte conditions, both being substantial problems in the use of ionic thickeners. The polyurethane-based thickener composition has been found to have easily controllable viscosity, leading to more easily formulated print pastes. Moreover, the thickener compositions of the invention do not require neutralization or preswelling. Surprisingly, the thickener compositions can exist in aqueous solution at high concentration without unduly increasing the viscosity. For example, in contrast with known thickeners, wherein clear concentrates are prepared containing only about 2% or less of thickener and in which formidable viscosity prohibits easy handling, the clear concentrates of the invention may contain high concentrations of thickener without unduly high viscosity. As a result the dye pastes of the invention may be far more easily formulated with the clear concentrates. As a further consequence, clear concentrates containing the thickeners of the invention may be directly blended with dyestuffs (such as presscake dispersions) and water to form color concentrates without the need to form cut clear compositions.

Still further, the polyurethane-based thickener compositions may be used in the liquid state, thereby avoiding the problems of dispersing in water certain highly hygroscopic thickeners, such as carboxyl vinyl polymers. Fibrous materials treated with dye print pastes containing the thickeners of the invention exhibit bright, clear color without unduly stiffening the fabric or impregnating the fabric to such depth as to appear on the reverse side.

Advantageously, while dye print pastes containing the thickeners provide a level of viscosity effective for good cover, the viscosity decreases sufficiently under the increased shear accompanying screen printing or other form of application, so that the pastes can be easily admixed and passed through a screen or otherwise applied. Thereafter, the viscosity recovers so that dripping and smearing are avoided. Pastes incorporating the thickeners are usually simple aqueous dispersions. Emulsion-forming hydrocarbon solvents are not required.

The hydrophobic branching groups of the polyurethane component are believed responsible, in cooperation with the cothickening surfactant, for the remarkable improvement in viscosity control and dye binding properties provided by the thickener compositions. Thus, water soluble or water-insoluble dyes contained in pastes thickened by the polyurethane/surfactant compositions of the invention are far more resistant to leaching out during wash cycles of fibrous articles printed with the pastes. The usefulness of the thickener compositions of the invention in dye pastes containing water soluble dyestuffs, such as acid or cationic dyes, has special significance because of an increasing shift to the continuous dye printing of tufted carpets.

THE POLYURETHANE THICKENERS

The polyurethane thickeners of the invention have at least three low molecular weight hydrophobic branching groups. Many of the polymers also contain one or more internal hydrophobic groups. The hydrophobic groups together contain a total of at least 20 carbon atoms and are linked through hydrophilic (water soluble) groups containing polyether segments of at least about 1500, preferably at least about 3000, molecular weight each so that the polymers readily solubilize in water, either by self-solubilization or through interaction with a solubilizing agent such as a water miscible alcohol or the surfactant cothickener. The molecular weight of the polyurethanes is of the order of about 10,000 to 400,000 preferably about 18,000 to 350,000.

The polymers are prepared in non-aqueous media in a known manner and are the reaction products of certain combinations of the following reactants: (a) at least one water soluble polyether polyol; (b) at least one water insoluble organic diisocyanate; (c) at least one water insoluble organic polyisocyanate containing three or more isocyanate groups; (d) at least one hydrophobic organic monofunctional active hydrogen compound; (e) at least one hydrophobic organic monoisocyanate; and (f) at least one polyhydric alcohol or polyhydric alcohol ether, containing three or more hydroxyl groups.

The polyurethane products formed include the following:

I: Reaction products of reactants (a) and (e), wherein reactant (a) contains at least three hydroxyl groups;
II: Reaction products of reactants (a), (c) and (d);
III: Reaction products of reactants (a), (b), (d) and (f);
IV: Reaction products of reactants (a), (b), (e) and (f);
V: Reaction products of reactants (a), (b), (c) and (d);
VI: Reaction products of reactants (b), (e) and (f);
VII: Reaction products of reactants (a), (c) and (e);
VIII: Reaction products of reactants (b), (d) and (f).

The reactants are normally employed in substantially stoichiometric proportions, that is, the ratio of total equivalents of active hydrogen containing reactants to isocyanate reactants is at least 1:1. A slight stoichiometric excess, e.g., about 5–10%, of monofunctional active hydrogen containing compound may be used to eliminate any unreacted isocyanate functionality, thus avoiding toxicity from this source. Greater excesses, particularly of capping hydroxyl compound, may be used to increase thickening efficiency. A slight excess of a monoisocyanate is sometimes desirable in cases where such isocyanate is a capping hydrophobe, to ensure capping of all available active hydrogen functionality.

By "monofunctional active hydrogen compound" is meant an organic compound having only one group which is reactive with isocyanate, such group therefore containing an active hydrogen atom, and any other functional groups, if present, being substantially unreactive to isocyanate. Such compounds include monohydroxy compounds such as alcohols, alcohol ethers and monoamines, as well as polyfunctional compounds, providing the compound is only monofunctional to isocyanates. For example, the primary amines, although difunctional in many reactions, are only monofunctional towards isocyanates, the hydrogen atom in the resulting urea group being relatively unreactive to isocyanate as compared with the hydrogen atom of the amino group or of unhindered alcohols.

The polyether polyol reactant (a) is an adduct of an alkylene oxide and a polyhydric alcohol or polyhydric alcohol ether, a hydroxyl-terminated prepolymer of such adduct and an organic polyisocyanate, or a mixture of such adducts with such prepolymers. Reactant (d) is a "capping" compound, meaning it reacts with ("caps") the terminal functional groups of the reaction product of reactants (a) and (b). Reactant (f) may be employed to terminate isocyanate functionality or to link isocyanate-terminated reaction intermediates. Reactant (f) may be a polyhydric alcohol or polyhydric alcohol ether of the same type as used to form the adducts of reactant (a). The polyhydric alcohols or alcohol ethers may be aliphatic, cycloaliphatic or aromatic and may be used singly or in mixtures of either type or mixtures of the two types. The organic polyisocyanates include simple di- and triisocyanates, isocyanate-terminated adducts of such polyhydric alcohols and organic di- or triisocyanates, as well as isocyanate-terminated prepolymers of polyalkylene ether glycols and organic di- or triisocyanates.

The hydrophobic groups of the polyurethanes occur in the residues of reactants (b) and (d) and may also occur in the residue of reactants (e) or (f) if present. The terminal (external) hydrophobes are the residues of the monofunctional active hydrogen compounds, organic monoisocyanates, or combinations of the residues of such compounds.

By appropriate selection of reactants and reaction conditions, including proportions and molecular weights of reactants, a variety of polymeric products may be obtained. The products exhibit good thickening properties due to the presence and distribution therein of hydrophilic polyether groups (residues of the polyol reactant) and hydrophobic groups (residues of hydroxy compounds, amines and/or isocyanates). In this specification the term "hydrophobe" includes not only the hydrocarbon residues of hydroxyl, amino or isocyanate reactants but also the combination of such residues with next adjacent urethane and other groups remaining in the structure after reaction. The term "hydrophobe" or like term therefore is used herein to mean all those portions or segments of the polymeric reaction products which contribute to water insolubility. All portions or segments other than the residues of the polyether polyol reactants therefore are hydrophobic.

Those urethane polymers based upon reaction of a polyhydric compound such as trimethylolpropane, pentaerythritol, dipentaerythritol or a triisocyanate with a monofunctional capping compound such as monoisocyanate or monohydroxy compound, have readily identifiable structures. These may be visualized as hydrophobic nuclei from which radiate hydrophilic polyether segments which are partially or fully capped (terminated) with hydrophobic groups. The resulting branches may have the same or different chain length and may contain hydrophobic segments alternating with hydrophilic portions. Reaction products (I) and (II) of the foregoing list have such configurations.

However, most of the urethane polymers are complex mixtures of linear, branched and sub-branched products which form networks of hydrophobes and hydrophobic segments interspersed with hydrophilic segments. The products result from the multitude of different interactions which may take place between the several different polyfunctional reactants used to form them. The essential reactants are a polyfunctional compound containing at least three hydroxyl or isocyanate groups, a difunctional compound reactive with the polyfunctional compound, and a monofunctional capping reactant such as a monohydroxy or monoamino compound. The reactants may each be present singly or in mixtures of two or more. The di-functional compound is a diisocyanate (for reaction with the triol or higher polyol) or a diol (for reaction with the triisocyanate) and can also be present singly or in mixtures of two or more. The monohydroxy or monoamino compound, or mixture thereof, is added to the reaction mixture to cap isocyanate of the triisocyanate not reacted with the diol, thereby providing terminal hydrophobes and preventing gelation. A monoisocyanate may be added to the reaction mixture if some of the polyol (diol, triol or higher polyol) remains unreacted or if it is desired to cap all hydroxyl groups. Capping or hydrolyzing of all isocyanate, although not absolutely necessary, is preferred to avoid toxicity in the polymeric product. Generally, no more than about 25% of the hydroxyl should remain uncapped since the hydroxyl increases the water solubility and reduces thickening efficiency. Of course, if the product contains a relatively high proportion of hydrophobic residues, a greater amount of uncapped hydroxyl can be tolerated.

More particularly, these complex polyurethane compositions may be described as the reaction products of: (i) a polyfunctional reactant selected from an organic polyol having at least three hydroxyl groups, an organic polyisocyanate having at least three isocyanate groups, and mixtures thereof; (ii) a difunctional reactant selected from an organic diol, an organic diisocyanate, and mixtures thereof; (iii) a monofunctional hydroxyl or amino compound in an amount sufficient to cap any unreacted isocyanate remaining from the reaction of reactants (i) and (ii) and to prevent gelation of the reaction mixture; and optionally, (iv) a hydrophobic organic monoisocyanate to cap hydroxyl groups remaining from the reaction of reactants (i) and (ii); wherein at least one of the polyol and diol contains at least one water soluble polyether segment of at least 1500 molecular weight, wherein the total carbon content of all hydrophobic groups is at least 20 and the average molecular weight of the polyurethane product is about 10,000–400,000.

As a general rule, the polyether segments of the polyurethane thickeners have molecular weights of at least 1500 (preferably 3000–20,000) and the polymers contain, on the average, at least three branching hydrophobic groups and at least two water soluble polyether segments linking the hydrophobes. The sum of the carbon atoms in the hydrophobic groups is at least 20, preferably at least 30, and the total molecular weight of the polymers is about 10,000–400,000, preferably 15,000–350,000. The optimum polyether content will depend, of course, on the bulk and distribution of the hydrophobic groups in the polymer. Whereas a total polyether molecular weight of 4000–5000 may be suitable when the polymer contains small external and internal hydrophobes, a substantial increase in the polyether content may be required when heavier and/or more extensively branched hydrophobic groups are to be built into the polymer, such as long chain fatty polyols or amines. About 200 carbon atoms in the hydrophobic portion is the practical upper limit although it will be understood that it is a relative matter since the proportion of polyether may be increased to offset increased hydrophobicity.

The reactants (a) used to form the polyurethanes of the invention are water soluble polyether polyols. Typically, these are adducts of an aliphatic, cycloaliphatic or aromatic polyhydroxy compound such as a polyhydric alcohol or polyhydric alcohol ether and an alkylene oxide such as ethylene oxide or propylene oxide, or they may be hydroxyl-terminated prepolymers of such adducts and an organic polyisocyanate. The adducts or prepolymers may be mixtures of two or more of such adducts or prepolymers, and mixtures of such adducts with prepolymers may also be used. The polyhydric alcohols include not only the simple glycols such as ethylene glycol and propylene glycol but also hydroxy compounds containing three or more hydroxyl groups, such as trimethylol propane, pentaerythritol, glycerol, erythritol, sorbitol, mannitol, and the like. The polyhydric alcohol ethers usually are adducts of polyhydric alcohols and alkylene oxides but in some cases are present as byproducts with other polyhydroxy compounds. For example, pentaerythritol as ordinarily prepared contains about 15% of the ether, dipentaerythritol. Typical of cycloaliphatic polyhydric compounds are cyclopentandiol-1,2, 1,4-cyclohexandiol, hexahydroxycyclohexane, and the like. The polyhydroxy compounds also include aromatic compounds such as di- and trihydroxy benzene and the like.

A convenient source of the hydrophilic polyether polyol adducts is a polyalkylene glycol (also known as a polyoxyalkylene diol) such as polyethylene glycol, polypropylene glycol or polybutylene glycol, of about 4,000–20,000 molecular weight. However, adducts of an alkylene oxide and a monofunctional reactant such as a fatty alcohol, a phenol or an amine, or adducts of an alkylene oxide and a difunctional reactant such as an alkanolamine (e.g., ethanolamine) are also useful. Such adducts are also known as diol ethers and alkanolamine ethers.

Suitable compounds providing polyether segments also include amino-terminated polyoxyethylenes sold under the trademark "Jeffamine", a typical compound being "Jeffamine 2000" of about 2000 molecular weight.

Reactants (b) and (c) are water insoluble organic diisocyanates and polyisocyanates containing three or more isocyanate groups, respectively. These isocyanates [which may also be used to form the hydroxylterminated prepolymers included among reactants (a)], may be aliphatic, cycloaliphatic or aromatic, such as the following, and may be used singly or in admixture of two or more thereof including mixtures of isomers:

1,4-tetramethylene diisocyanate
1,6-hexamethylene diisocyanate ("HDI")
2,2,4-trimethyl-1,6-diisocyanatohexane
1,10-decamethylene diisocyanate
1,4-cyclohexylene diisocyanate
4,4'-methylenebis(isocyanatocyclohexane)
1-isocyanato-3-isocyanatomethyl-3,5,5-trimethylcyclohexane
m- and p-phenylene diisocyanate
2,6- and 2,4-tolylene diisocyanate ("TDI")
xylene diisocyanate
4-chloro-1,3-phenylene diisocyanate
4,4'-biphenylene diisocyanate
methylenedi-p-phenylene diisocyanate ("MDI")
1,5-naphthylene diisocyanate
1,5-tetrahydronaphthylene diisocyanate
polymethylene polyphenylisocyanates sold under the brand name "PAPI", such as "PAPI 135" (equivalent weight of 133.5 and average isocyanate functionality of 2.7) and "PAPI 901" (equivalent weight of 133 and average isocyanate functionality of 2.3)
aromatic triisocyanate adduct of trimethylol propane and tolylene diisocyanate sold under the brand name "Mondur CB-75".
aliphatic triisocyanate product of the hydrolytic trimerization of 1,6-hexamethylene diisocyanate, sold under the brand name "Desmodur N"
$C_{36}$ dimer acid diisocyanate sold under the brand name "DDI", based on dimer acids as discussed in J. Am. Oil Chem. Soc. 51, 522 (1974).

The monoisocyanates representative of reactant (e) include straight chain, branched chain and cyclic isocyanates such as butyl isocyanate, octyl isocyanate, dodecyl isocyanate, octadecyl isocyanate, cyclohexyl isocyanate and the like. These isocyanates also may be used singly or in mixtures of two or more thereof and are a convenient method of introducing terminal hydrophobes into the polymer.

The mono or polyisocyanates also include any polyfunctional isocyanate derived from reaction of any of the foregoing isocyanates and an active hydrogen compound having a functionality of at least two, such that at least one isocyanate group remains unreacted. The use of such isocyanates is equivalent to chain-extending an isocyanate terminated isocyanate/diol reaction product with a reactant containing at least two active hydrogen atoms in a manner well known in polyurethane synthesis.

A variety of other useful mono- or polyisocyanates are set forth in texts on urethane chemistry, including "Advances In Urethane Science and Technology", K. S. Frisch and S. L. Reegan, editors, Technomic Publishing Co., Inc. Volume 1 (1971) and Volume 2 (1973), and references cited therein. The isocyanates may contain any number of carbon atoms effective to provide the required degree of hydrophobic character. Generally, about 4 to 30 carbon atoms are sufficient, the selection depending on the proportion of the other hydrophobic groups and hydrophilic polyether in the product.

Representative of monofunctional active hydrogen compounds of reactants (d) wherein the functional group is hydroxyl are the fatty ($C_1$–$C_{24}$) alcohols such as methanol, ethanol, octanol, dodecanol, tetradecanol, hexadecanol, and cyclohexanol; phenolics such as phenol, cresol, octylphenol, nonyl and dodecyl phenol; alcohol ethers such as the monomethyl, monoethyl and monobutyl ethers of ethylene glycol, and the analogous ethers of diethylene glycol; alkyl and alkaryl polyether alcohols such as straight or branched ($C_1$–$C_{22}$) alkanol/ethylene oxide and alkyl phenol/ethylene oxide adducts (e.g., lauryl alcohol, t-octylphenol or nonylphenol-ethylene oxide adducts containing 1–250 ethylene oxide groups); and other alkyl; aryl and alkaryl hydroxy compounds including mixtures thereof, such as $C_{10}$–$C_{20}$ normal alcohol mixtures known as "Alfol" alcohols.

Amino compounds, which may be used in place of all or a portion of the monohydroxy compounds as monofunctional active hydrogen compounds, are primary or secondary aliphatic, cycloaliphatic or aromatic amines such as the straight or branched chain alkyl amines, or mixtures thereof, containing about 1–20 carbon atoms in the alkyl group. Suitable amines include n- and t-octyl amine, n-dodecyl amines, $C_{12}$–$C_{14}$ or $C_{18}$–$C_{20}$ t-alkyl amine mixtures, and secondary amines such as N,N-dibenzyl amine. N,N-dicyclohexyl amine and N,N-diphenyl amine. The lower alkyl ($C_1$–$C_7$) amines may be used if there is sufficient hydrophobic residue in the product from other sources such as isocyanate or hydroxyl compound to provide a total of at least ten carbon atoms in the terminal groups (taken together) of the polymeric products. The amino compounds may contain more than one active hydrogen atom provided that under normal reaction conditions it is only monofunctional towards an isocyanate group. A primary amine is an example of such a compound.

The polymers are prepared according to techniques generally known for the synthesis of urethanes, preferably such that no isocyanate remains unreacted; water should be excluded from the reaction since it will consume isocyanate functionality. Anhydrous conditions are accomplished by azeotropic distillation to remove water, by heating under a nitrogen sparge, or by prior drying of reactants.

The use of prepolymers, adducts or other reactants containing ester groups should be avoided, due to hydrolytic instability of products containing such groups. However, the reactants may contain any other groups provided such groups are inert, i.e., they do not interfere in formation of the desired products. For example, halogens such as chlorine and bromine normally would not prevent formation of useful polymers.

SURFACTANT COTHICKENERS

The surfactants which enhance the thickening capabilities of the polyurethane thickeners may be nonionic or ionic (cationic, anionic or amphoteric) including any compatible mixtures thereof. Nonionics are preferred.

Suitable nonionic surfactants include alkylphenoxypolyethoxyethanols having alkyl groups of about seven to eighteen carbon atoms and 1 to 60 or more oxyethylene units, such as heptylphenoxypolyethoxyethanols, octylphenoxypolyethoxyethanols, methyloctylphenoxypolyethoxyethanols, nonylphenoxypolyethoxyethanols, dodecylphenoxypolyethoxyethanols, and the like; polyethoxyethanol derivatives of methylene linked alkyl phenols; sulfur-containing agents such as those made by condensing 1 to 60 or more moles of ethylene oxide with nonyl, dodecyl, tetradecyl, t-dodecyl, and the like mercaptans or with alkylthiophenols having alkyl groups of six to fifteen carbon atoms; ethylene oxide derivatives of long-chain carboxylic acids, such as lauric, myristic, palmitic, oleic, and the like or mixtures of acids such as found in tall oil containing 1 to 60 oxyethylene units per molecule; analogous ethylene oxide condensates of long-chained alcohols, such as octyl, decyl, lauryl, or cetyl alcohols, ethylene oxide derivatives of etherified or esterified polyhydroxy compounds having a hydrophobic hydrocarbon chain, such as sorbitan monostearate containing 1 to 60 oxyethylene units, etc.; also, ethylene oxide condensates of long-chain or branched-chain amines, such as dodecylamine, hexadecylamine, and octadecylamine, containing 1 to 60 oxyethylene groups, and block copolymers of ethylene oxide and propylene oxide comprising a hydrophobic propylene oxide section combined with one or more hydrophilic ethylene oxide sections.

Examples of useful anionic surfactants include the ordinary soaps such as the alkali metal, ammonium and alkanolamine salts of fatty acids including sodium oleate, potassium palmitate, ammonium stearate ethanolamine laurate, and the like as well as rosin and dehydrated rosin acid soaps, and the synthetic saponaceous materials including the higher aliphatic sulfates and sulfonates such as sodium lauryl sulfate, sodium cetyl sulfate, the sodium salts of sulfonated paraffin oils, the sodium salts of dodecane-1-sulfonic acid, octadecane 1-sulfonic acid, etc., the alkaryl sulfonates such as the sodium alkyl aryl sulfonates, e.g., sodium isopropyl benzene sulfonate, sodium isopropyl naphthalene sulfonate, the alkali metal salts of sulfonated dicarboxylic acid esters and amides such as sodium dioctyl sulfosuccinate, sodium N-octadecyl-sulfonsuccinamide, sulfonated or sulfated alkyl phenoxyethoxyethanols having from 1 to 50 oxyethylene units per molecule in which the alkyl has from 4 to 18 carbon atoms, such as hexyl, n-octyl, t-octyl, lauryl, hexadecyl, and octadecyl, and the like.

Cationic surfactants include stearamidopropyldimethyl-beta-hydroxyethyl ammonium dihydrogen phosphate, stearamidopropyldimethyl-beta-hydroxyethyl ammonium nitrate, stearoguanamine, stearoguanamine ethylene oxide reaction products, octadecylamine salts of octadecyl carbamic acid and octadecyl guanamine salts of octadecyl carbamic acid, reacted with ethylene oxide, octadecylamine tetraethylene glycol, rosin amine ethylene oxide reaction products, and the like. Also included are undecylimidazoline and reaction products with ethylene oxide and propylene oxide, oleylaminodiethylamine hydrochloride, condensation products of fatty acids and degraded proteins, monostearylethylenediamine trimethylammonium sulfate, alkyl benzene imidazolines, cetyl pyridinium bromide, octadecyl pyridinium sulfate or chloride, octadecylmethylene pyridinium acetate, laurylureaethylene oxide, methyl sulfate of dimethyl octadecyl sulfonium, condensates of halohydrins and amines, polyamines and ammonia, alkyl phosphonium compounds, alkyl phosphonium ethylene oxide condensates, rosin amines condensed with ethylene oxide and propylene oxide; cetyl dimethylbenzyl ammonium chloride, distearyl dimethyl ammonium chloride, stearyl dimethylbenzyl ammonium chloride, n-alkyl dimethylbenzyl ammonium chloride, methyl dodecylbenzyl trimethyl ammonium chloride, methyl dodecyl xylene bis(trimethylammonium chloride) cetyl trimethyl ammonium bromide, and the like.

Amphoteric surfactants include the sodium salt of N-coco beta aminopropionate, N-coco beta aminopropionic acid, disodium N-lauryl beta-iminodipropionate, dicarboxylic coconut derivative diethanolamine salt, dicarboxylic palmitic derivative sodium salt, C-cetyl betaine, and N-lauryl betaine.

Fluorine containing surfactants are also useful, especially where the print paste requires the use of a non-aqueous diluent or solvent which lowers the viscosity of the system. A typical solvent of this character is benzyl alcohol, a common ingredient of acid dye print pastes. The fluorine containing surfactant in this instance not only enhances the viscosity attainable by the polyurethane thickener but also causes recovery of the viscosity if the paste contains benzyl alcohol. Fluorine containing surfactants of all types are useful, whether ionic or nonionic. Among the anionic types may be mentioned ammonium perfluoroalkyl sulfonates, potassium perfluoroalkyl sulfonates, potassium fluorinated alkyl carboxylates, and ammonium perfluoro alkyl carboxylates. The fluorinated alkyl esters are examples of nonionic types. The foregoing and other fluorine containing surfactants are commercially available, such as surfactants FC-93, FC-95, FC-128, FC-143, FC-430 and F-431 sold by 3M Company.

DYES

Any coloring material effective for the printing of fibers may be used in the print pastes of the invention. The coloring materials therefore include water insoluble and water soluble, natural or synthetic, dyestuffs of all types, for example organic and inorganic pigments, acid dyes, and cationic dyes. Classified in other manners, such dyestuffs include vat dyes, direct dyes, disperse dyes, reactive dyes, metal complex dyes, and pigment dyes. Print pastes containing acid dyes are normally maintained at a pH of about 2-6.

VISCOSITY ENHANCEMENT

The following data illustrates the enhancement and control of viscosity in aqueous solution obtained by combining a surfactant with a polyurethane in accordance with the invention. The polyurethane thickener is prepared by forming the triol adduct of trimethylolpropane, a polyoxyethylene diol of about 1200 molecular weight and toluene diisocyanate, and then reacting with a polyoxyethylene diol of 6000 molecular weight and octadecanol, to give a product of the structure:

$$\mathrm{TMP[(EO)_{\mathit{x}}(TDI-EO)_{\mathit{z}}(TDI-C_{18})]_3}$$

The product is similar to the product of Example 36 hereafter.

Nonionic cothickener A is Triton X-102 surfactant, Rohm and Haas Company, Philadelphia. Anionic cothickener B is sodium lauryl sulfate.

It will be noted that the viscosity passes through a maximum as a function of cothickener concentration, and that the maxima occur at relatively low cothickener concentration. This permits high thickening efficiency and economical thickening since relatively low levels of the thickener system are effective.

| Polyurethane Thickener, % | Nonionic Cothickener A, % | [1]Viscosity | Anionic Cothickener B, % | [1]Viscosity (cps) |
|---|---|---|---|---|
| 1.5 | — | 100 | — | 100 |
| " | .05 | 300 | .0335 | 19,000 |
| " | .10 | 300 | .067 | 27,000 |
| " | .50 | 13,300 | .135 | 31,600 |
| " | 1.0 | 54,500 | .27 | 14,700 |
| " | 1.5 | 100,000 | .54 | 3,000 |
| " | 2.0 | 45,150 | .81 | 350 |
| " | 2.5 | 31,200 | 1.08 | 150 |
| " | 3.0 | 12,000 | 1.62 | 450 |
| " | 4.0 | 1,700 | 2.16 | 500 |

[1]Brookfield, No. 4 spindle, 6 rpm,

The enhancement of viscosity afforded by the surfactant cothickeners in aqueous solution is further illustrated by the following data wherein the polyurethane thickeners are those of the Examples below. Viscosity measurement was by Brookfield viscometer, No. 4 spindle, 6 rpm.

| Polyurethane Thickener | | Nonionic Cothickener A, % | Viscosity |
|---|---|---|---|
| Ex. No. | % | | (cps) |
| 28 | 1.0 | — | 14,300 |
|  | 1.0 | 0.3 | 46,100 |
| 29 | 1.5 | — | 200 |
|  | 1.5 | 1.0 | >100,000 |
| 30 | 1.5 | — | 2,600 |
|  | 1.5 | 0.5 | >100,000 |
| 47 | 1.0 | — | 7,100 |
|  | 1.0 | 0.1 | 12,800 |
| 48 | 1.0 | — | 4,700 |
|  | 1.0 | 0.3 | 22,200 |
| 49 | 1.0 | — | 19,400 |
|  | 1.0 | 0.5 | 77,000 |

NON-AQUEOUS DILUENT

In order to control the viscosity of the clear concentrates while maintaining a high polyurethane thickener concentration, a non-aqueous organic diluent is present in the clear concentrate. Any diluent which is inert to the other ingredients of the clear concentrate and the dyestuff in the final pastes, can be used. Generally, such diluents are water-soluble polar liquids which are known solvents or solubilizers for urethane polymers. These include monohydroxy lower alcohols, such as methyl, ethyl and propyl (n, iso)alcohol; glycols, such as ethylene glycol, diethylene glycol, triethylene glycol, tetraethylene glycol, propylene glycol, dipropylene glycol, and the like; ethers such as diethylene glycol diethyl ether, dimethoxy tetraglycol, and the like; alcohol ethers, such as ethylene glycol monomethyl ether, ethylene glycol monoethyl ether, ethylene glycol monobutyl ether, diethylene glycol monomethyl ether, diethylene glycol monoethyl ether, diethylene glycol monoethyl ether, diethylene glycol monobutyl ether, and the like; esters such as ethylene glycol monomethyl ether acetate, diethylene glycol monoethyl ether acetate, and the like; ketones such as acetone, di-acetone alcohol, acetonyl acetone, and the like; and any mixtures of any of the foregoing compounds or homologs thereof. Of the foregoing, the water-soluble alcohols are preferred.

PREPARATION AND USE OF COMPOSITIONS

Thickeners for print pastes are conventionally prepared as high concentrate stock solutions for ease of admixture with other ingredients in forming a print paste. However, in contrast with thickeners which are supplied as powders or emulsions and which require neutralization or preswelling and subsequent further dilution, the polyurethane/surfactant thickener composition of the present invention requires only a single mixing step. Accordingly, clear concentrates are obtained by admixing the polyurethane thickener, the surfactant cothickener and organic diluent in amounts effective to obtain about 5–50% by weight of polyurethane thickener and a polyurethane to surfactant weight ratio of about 1:0.01 to about 1:10. If it is desired to add water, the water is preferably added last in order to avoid premature thickening. In such manner, clear concentrates are easily obtained having low, manageable viscosity (about 500–100,000 cps) but high polyurethane thickener concentration so that the final concentration of polyurethane thickener in color concentrates and print pastes made therefrom will be low (of the order of about 1–2% in the case of color concentrates and about 0.1–5%, preferably about 3%, in the case of the print pastes). The substantial enhancement of thickening efficiency resulting from the use of the surfactant with the polyurethane thus provides a convenient manner of obtaining optimum balance of viscosity control and thickener concentration at each step of formulation.

In the next formulation step, a dyestuff dispersion (about 30–60% solids, preferably about 50%) is admixed with the clear concentrate and water to provide a "color concentrate" containing about 0.1–20%, preferably 1–10%, by weight of the clear concentrate and about 0.1–20% by weight of the dyestuff, the balance being water. The proportions will vary according to the viscosity desired in the color concentrate, which may range from about 1000 to about 8000 cps, preferably about 5000 cps, and will also depend upon the amount of dyestuff desired in the concentrate.

In the final formulating step, a binder is added to the color concentrate, if the color concentrate contains a pigment, and the concentrate is diluted to an extent providing a desired increase in viscosity for good printability. Alternatively, portions of the color concentrate and the clear concentrate, in proportions of about 0.1–20% by weight of each, may be blended along with the binder and water, to obtain the print paste. The resultant print paste if it contains a pigment should have a viscosity of from about 1000 to about 50,000 cps, preferably about 10,000–40,000 cps. When the coloring material is a dyestuff other than a pigment, a binder dispersion is not required and the final viscosity will be lower, of the order of about 500–20,000 cps, preferably about 10,000 cps.

Binders are common ingredients of pigment pastes. Preferably, these are latices containing about 40–60% by weight of acrylic or methacrylic acid ester polymers which coalesce when deposited from the dispersions.

Less preferred are water soluble resins which are made water insoluble by subsequent treatment, and resinous materials which are soluble in organic solvents and emulsify in water. The resin content of the binder dispersions will depend on the amount of pigment and the type of binder and pigment. The foregoing and other aspects of pigment pastes are further described in the technical literature, such as U.S. Pat. Nos. 2,275,991, 2,886,474, and 3,647,735. Of course, the print pastes may also contain other conventional ingredients such as dispersants, buffering agents, couplers and the like, if desired. Other thickeners may also be utilized along with the polyurethane thickener and surfactant cothickener, if desired, such as carboxy vinyl polymers.

The print pastes are applied in any suitable manner known in the art and exhibit excellent brightness and color depth, minimum color penetration to the back of fibrous materials printed therewith, anti-haloing properties, soft-hand and little or no crocking. The print pastes may be used with various fiber types, both synthetic and natural fibers, and blends thereof, and the fibrous materials may take various forms, including wovens and non-wovens, in accordance with well known practice in the art.

The following examples further illustrate the invention. All parts and percentages are by weight unless otherwise specified.

EXAMPLES 1-14: REACTION PRODUCT I

EXAMPLE 1—Trimethylolpropane-ethylene oxide adduct capped with octadecyl isocyanate In a suitable reaction vessel 70 g. of trimethylolpropane-ethylene oxide adduct with a hydroxyl number of 12.5 (eq. wt. 4500 per OH) and about 100 g. of toluene were dried by azeotropic distillation. Then 0.07 g. of dibutyltin dilaurate and 6.34 g. of octadecyl isocyanate (NCO/OH=1.0) was added. After 4 days at 60° C., the sample was dried in a slab mold. A 3% aqueous mixture of the polymer forms a gel which is readily solubilized by the addition of methanol. The structure of this polymer product is set forth below in conjunction with Table 1 which also lists similar polymeric products prepared in essentially the same manner as the Example 1 product, with the major variations as indicated in the Table.

TABLE 1

$$CH_3CH_2-C[CH_2O-(CH_2CH_2O)_x-\overset{O}{\underset{\|}{C}}-\overset{H}{\underset{|}{N}}-R]_3$$

| Ex. No. | R | X | Equivalents NCO/OH |
|---|---|---|---|
| 1 | n-$C_{18}H_{37}$ | 102 | 1.37/1 |
| 2 | n-$C_{12}H_{25}$ | 132 | 1.2/1 |
| 3 | n-$C_8H_{17}$ | 142 | 1.2/1 |
| 4 | n-$C_{12}H_{25}$ | 73 | 0.9/1 |
| 5 | n-$C_{12}H_{25}$ | 73 | 1.1/1 |
| 6 | n-$C_{18}H_{37}$ | 132 | 1.2/1 |

EXAMPLE 7—Dipentaerythritol-ethylene oxide adduct capped with octadecyl isocyanate A dipentaerythritol-ethylene oxide adduct of 18.1 hydroxyl number (3100 equivalent weight) was heated under a nitrogen sparge to remove water. Utilizing dibutyltin dilaurate as catalyst, 70 g. of the adduct was reacted with 7.06 g. of octadecyl isocyanate, providing an NCO/OH ratio of 1.06/1 equivalents. The reaction was continued at 60° C. for four days. The polymeric product was then poured into a slab mold to dry and to solidify. A 3% aqueous mixture of this product forms a gel which is readily solubilized by methanol. The structure of this product is indicated by the formula below in conjunction with Table 2, which also shows similar polymers prepared in essentially the same manner as described above, and NCO/OH proportions in equivalents.

TABLE 2

$$O \{ CH_2-C\{CH_2O-(CH_2CH_2O)_x-\overset{O}{\underset{\|}{C}}-\overset{H}{\underset{|}{N}}-R\}_3\}_2$$

| Ex. No. | R | X | Equivalents NCO/OH |
|---|---|---|---|
| 7 | n-$C_{18}H_{37}$ | 70 | 1.06/1 |
| 8 | n-$C_{18}H_{37}$ | 27 | 0.89/1 |
| 9 | n-$C_{18}H_{37}$ | 44 | 0.81/1 |
| 10 | n-$C_{18}H_{37}$ | 44 | 0.49/1 |
| 11 | n-$C_{12}H_{25}$ | 167 | 0.9/1 |
| 12 | n-$C_{18}H_{37}$ | 167 | 0.9/1 |
| 13 | n-$C_{12}H_{25}$ | 167 | 1.25/1 |
| 14 | n-$C_{18}H_{37}$ | 167 | 1.25/1 |

EXAMPLES 15-27: REACTION PRODUCT II

EXAMPLE 15—Triisocyanate coupled with ethoxylated dodecanol and methoxy capped-polyethylene glycol Two mixtures of 40 g. each of ethoxylated dodecanol of 7300 molecular weight, 11.8 g. of monomethoxy capped-polyethylene glycol of 5000 molecular weight, 80 g. of toluene and 0.08 g. of dibutyltin dilaurate were dried by azeotropic distillation. After cooling to 60° C., 2.54 g. of Mondur CB-75 (Example 15) or 2.09 g. of Desmodur N (Example 16) were added to the reaction mixtures. After 3 hours at 60° C., the infrared spectrum indicated complete reaction, and the reaction mixtures were poured into slab molds to isolate the solid polymers. The structures of these and other polymers, prepared in essentially the same manner, are given below in conjunction with Table 3.

TABLE 3

$$[R(R')(R'')=O-(CH_2CH_2-O)_{x(x')}-\overset{O}{\underset{\|}{C}}-\overset{H}{\underset{|}{N}}_{(x'')}R''']_n$$

| Ex. No. | R | R' | R'' | R''' | x | x' | x'' | n |
|---|---|---|---|---|---|---|---|---|
| 15 | n-$C_{12}H_{25}$ | $CH_3$ | n-$C_{12}H_{25}$ | $C_{30}{}^1$ | 162 | 113 | 162 | 3 |
| 16 | " | " | " | $C_{20}{}^1$ | 162 | 113 | 162 | 3 |
| 17 | " | n-$C_{12}H_{25}$ | " | $C_{20}$ | 55 | 55 | 55 | 3 |
| 18 | t-octyl | t-octyl | t-octyl | $C_{20}$ | 166 | 166 | 166 | 3 |

TABLE 3-continued $$[R(R')(R'')=O-(CH_2CH_2-O)\overline{x_{(x')}}\overset{O}{\underset{(x'')}{C}}-\overset{H}{N}]_{\overline{n}}R'''$$

| Ex. No. | R | R' | R'' | R''' | x | x' | x'' | n |
|---|---|---|---|---|---|---|---|---|
| 19 | phenyl n-$C_{12}H_{25}$ | phenyl $CH_3$ | phenyl n-$C_{12}H_{25}$ | $C_{20}$ | 162 | 0 | 162 | 3 |
| 20 | " | n-$C_8H_{17}$ | " | $C_{20}$ | 162 | 0 | 162 | 3 |
| 21 | n-$C_{12}H_{25}$ | n-$C_{12}H_{25}$ | " | $C_{20}$ | 162 | 0 | 162 | 3 |
| 22 | n-$C_{14}H_{29}$ | $CH_3$ | n-$C_{14}H_{29}$ | $C_{30}$ | 166 | 113 | 166 | 3 |
| 23 | n-$C_{12}H_{25}$ | $CH_3$ | n-$C_{12}H_{25}$ | $C_{30}$ | 162 | 0 | 162 | 3 |
| 24 | t-octyl phenyl | $CH_3$ | n-octyl phenyl | $C_{20}$ | 144 | 120 | 144 | 3 |
| 25 | nonyl-phenyl | $CH_3$ | $CH_3$, nonyl phenyl (1:1) | $C_{20}$ | 152 | 120 | 152/120 | 3 |
| 26 | nonyl-phenyl | $CH_3$ | $CH_3$, nonyl phenyl (1:1) | $C_{30}$ | 152 | 120 | 152/120 | 3 |
| 27 | $C_{12}$-phenyl | $C_{12}$-phenyl | $C_{12}$-phenyl | $C_{20}$ | 135 | 135 | 135 | 3 |

[1] residue of "Mondur CB-75" triisocyanate
[2] residue of "Desmodur N" triisocyanate

EXAMPLES 28–77: COMPLEX POLYMERS

As indicated above, the presence of a difunctional reactant (polyether diol or diisocyanate) in a reaction mixture with a trifunctional reactant (or higher functionality) such as a triisocyanate or trihydroxy compound, respectively, leads to complex branching in the product and a variety of polymeric products the identity of which cannot adequately be determined. However, the polymeric reaction product mixtures contain the requisite proportions of hydrophobic and hydrophilic materials for good thickening properties and therefore are useful products.

Table 4 below summarized many of the possible combinations of reactants which provide polymeric reaction products of this class, and the proportions in equivalents of reactants effective for such reactions. The subsequent Examples and Tables illustrate the products more particularly. The identification of the reactants corresponds to the identification set forth above under "The Polyurethane Thickeners".

EXAMPLES 28–39: REACTANT PRODUCT III

EXAMPLE 28

A mixture of 1.62 g. of octadecanol, 0.25 g. of dipentaerythritol, and 183 g. of PEG-6000 (eq. wt. 3800) in 450 g. of toluene was dried by azeotropic distillation. At 80° C., 0.2 g. of dibutyltin dilaurate and 5.2 g. of TDI were added and the temperature was maintained at 80° C. for 4 hours. Additional 1.62 g. of octadecanol was then introduced and the temperature was kept at 80° C. for another hour. The mixture was poured out to air dry. A 1% aqueous mixture of the product has a viscosity of 14,300 cps. The viscosity increased to 46,100 cps upon the addition of 0.3% Triton X-102 nonionic surfactant.

EXAMPLE 29—Polybranched polymers from a trimethylolpropaneethylene oxide adduct, TDI, PEG and octadecanol A mixture of 61 g. of a trimethylolpropaneethylene oxide adduct of hydroxyl number 18.2 (3100 equivalent wt.), 240 g. of PEG (6000 molecular wt.) and 5.4 g. of octadecanol was dried by azeotropic distillation of a solution in 539 g. of toluene. The mixture was cooled to

TABLE 4

REACTANT PROPORTIONS - EQUIVALENTS

| Reaction Product Class | Ex. Nos. | (f) Polyol | (a) Polyether Diol | (d) Mono-ol | (c) Tri-NCO | (b) Di-NCO | (e) Mono-NCO | (d) Mono-Amine |
|---|---|---|---|---|---|---|---|---|
| III | 28–39 | 1.0 | 2–5 | 1–2.5 or excess | | 75–100% of OH or excess | | |
| IV | 40–46 | 1.0 | 1–3 | | | 1–3 | 75–100% of OH or excess | |
| V | 47–62 | | 2–7 | 1–2.5 or excess | 1.0 | 75–100% of OH or excess | | |
| VI | 63–67 | 1.0 | | | | 0.1–0.6 | 75–100% of OH or excess | |
| VII | 68–73 | | 1.0 | | 0.1–0.5 | | 75–100% of OH or excess | |
| VIII | 74–77 | 0.1–1.2 | | 2.1–1.1 or excess | | 75–100% of OH or excess | | |

60° C., 11.3 g. of TDI and 0.3 g. of dibutyltin dilaurate were added, and the temperature was raised to 70° C. Three hours later, 4.1 g. of octadecanol was added and the temperature was raised to 80° C. After 3 hours at 80° C., the reaction mixture was poured into a slab mold and the toluene removed by evaporation. A 1.5% aqueous mixture of the polymeric product has a viscosity of 200 cps. The viscosity increased to over 100,000 cps upon the addition of Triton X-102 nonionic surfactant.

EXAMPLE 30—Polybranched polymer from trimethylolpropane, TDI, PEG and octadecanol The procedure of Example 29 was followed, but 0.9 g. of TMP was substituted for the trimethylolpropaneethylene oxide adduct of Example 29. A 1.5% aqueous mixture of the product has a viscosity of 2600 cps. The viscosity increases to over 100,000 cps upon the addition of 0.5% of Triton X-102 nonionic surfactant.

EXAMPLE 31—Triol-PEG adducts reacted with monohydric alcohol and diisocyanate, and capped with monohydric alcohol A mixture of 10.5 g. of "Pluracol" TP-1540 (triol adduct of propylene oxide and trimethylolpropane), 244.5 g. of PEG-6000 (eq. wt. 3700), 0.3 g. of dibutyltin dilaurate, 5.4 g. of octadecanol and 400 g. of toluene was dried by azeotropic distillation. At 60° C., 11.3 g. of tolylene diisocyanate was added. After 3 hours at 70° C., an additional 4.05 g. of octadecanol was added. After an additional 3 hours at 80° C., the mixture was poured out to air dry. Table 5 lists the foregoing and other reactants used to prepare other polymers essentially as described above. The proportion of equivalents of the reactants is given in parentheses.

In these and the subsequent Examples "TMP" is trimethylolpropane, "EO" is ethylene oxide and "PO" is propylene oxide. The subscript to EO or PO indicates the number of EO or PO units in the reactants.

TABLE 5

| Ex. No. | Triol (eq.) | Diol (eq.) | Mono-OH Alcohol (eq.) | Diisocyanate (Eq.) |
|---|---|---|---|---|
| 29 | TMP . $EO_{66}$ (1.0) | PEG-6000 (4.0) | $C_{18}H_{37}$ (1.75) | $C_7H_6$ (6.5) |
| 30 | TMP (1.0) | PEG-6000 (4.0) | $C_{18}H_{37}$ (1.75) | $C_7H_6$ (6.5) |
| 31 | TMP . $PO_8$ (1.0) | PEG-7400 (3.3) | $C_{18}H_{37}$ (1.75) | $C_7H_6$ (6.5) |
| 32 | TMP . $PO_8$ (1.0) | PEG-7400 | $C_{18}H_{37}$ (1.0) | $C_7H_6$ (8.2) |
| 33 | TMP . $PO_8$ (1.0) | PEG-7400 (4.0) | $C_{18}H_{37}$ (1.0) | $C_7H_6$ (6.2) |
| 34 | TMP . $PO_3$ (1.0) | PEG-7400 (2.5) | $C_{18}H_{37}$ (1.5) | $C_7H_6$ (5.0) |
| 35 | TMP . $EO_{27}$ (1.0) | PEG-6000 (4.0) | $C_8H_{17}$ (3.75) | $C_7H_6$ (7.5) |
| 36 | TMP . $EO_{27}$ (1.0) | PEG-6000 (4.0) | $C_{18}H_{37}$ (3.75) | $C_7H_6$ (7.5) |
| 37 | TMP . $EO_{27}$ (1.0) | PEG-6000 (4.0) | t-octylphenol (2.5) | $C_{13}H_{22}$ (7.5) |
| 38 | TMP . $EO_{27}$ (1.0) | PEG-6000 (4.0) | $C_{18}H_{37}$ . $EO_{125}$ (2.5) | $C_{18}H_{22}$ (7.5) |
| 39 | TMP (1.0) | PEG-6000 (4.0) | $C_{18}H_{37}$ . $EO_{125}$ (1.5) | $C_{13}H_{22}$ (6.5) |

EXAMPLES 40-46: REACTION PRODUCT IV

Polybranched polymers from PEG, a trimethylolpropane-ethylene oxide adduct, octadecyl isocyanate and a diisocyanate

EXAMPLE 40

A mixture of 225 g. of PEG (20,000 molecular weight) and 400 g. of toluene was dried by azeotropic distillation at 70° C. Then 0.225 g. of dibutyltin dilaurate and 3.34 g. of octadecyl isocyanate was added. Two hours later, still at 70° C., 7.4 g. of "DDI" was added. In one hour, 37.5 g. of a trimethylolpropane-ethylene oxide adduct of hydroxyl number 17.1 and equivalent weight 3300 predried in toluene solution, was added. After five days at 60° C., the mixture was dried in a slab mold. A 3% aqueous mixture of the product has a viscosity of 200,000 cps. Table 6 describes the foregoing and other reactants giving other polymeric products prepared in essentially the same manner. The proportion of equivalents of reactants is given in parentheses.

TABLE 6

| Ex. No. | Triol (eq.) | Diol (eq.) | Diisocyanate (eq.) | Monoisocyanate (eq.) |
|---|---|---|---|---|
| 40 | TMP.$EO_{75}$(1.0) | PEG-20,000 (2.0) | $C_{36}$ (2.0) | $C_{18}$ (1.0) |
| 41 | TMP.$EO_{73}$(1.0) | PEG-6000 (2.0) | $C_{36}$ (2.0) | $C_{18}$ (1.0) |
| 42 | TMP.$EO_{73}$(1.0) | PEO-6000 (2.0) | $C_{36}$ (1.5) | $C_{18}$ (0.67) |
| 43 | TMP.$EO_{117}$(1.0) | PEG-6000 (3.0) | $C_7H_6$ (3.1) | $C_{18}$ (1.1) |
| 44 | TMP.$EO_{117}$(1.0) | PEG-6000 (2.0) | $C_7H_6$ (2.1) | $C_{18}$ (1.1) |
| 45 | TMP.$EO_{142}$(1.0) | PEG-20,000 (0.4) | $C_7H_6$ (0.9) | $C_{18}$ (0.75) |
| 46 | TMP.$EO_{142}$(1.0) | PEG-20,000 (0.4) | $C_7H_6$(0.9) | $C_{12}$ (0.75) |

EXAMPLES 47-62: REACTION PRODUCT V

Polyethylene glycol and monohydric alcohols reacted with diisocyanate and triisocyanate

EXAMPLE 47

A mixture of 205 g. of PEG-6000 (eq. wt. 3800), 1.46 g. of hexadecanol and 463 g. of toluene was dried by azeotropic distillation. At 80° C., 0.2 g. of dibutyltin dilaurate, 7.08 g. of 4,4'-dicyclohexylmethane diisocyanate (Hylene W) and 1.98 g. of Mondur CB-75 triisocyanate were added. After 4 hours at 80° C., an additional 1.46 g. of hexadecanol was introduced, to assure complete capping, at 80° C. for one hour. The reaction mixture was poured out to air dry. A 1% aqueous mixture of the product has a viscosity of 7100 cps. The viscosity increases to 12,800 cps upon the addition of 0.1% Triton X-102 nonionic surfactant.

EXAMPLE 48

The procedure of Example 47 was followed in all essential respects using 1.79 g. of eicosanol in place of hexadecanol and 6.75 g. of MDI in place of Hylene W. A 1% mixture of the product in water has a viscosity of 4700 cps. The viscosity increases to 22,200 cps upon the addition of 0.3% Triton X-102 nonionic surfactant.

EXAMPLE 49

The procedure outlined in Example 47 was followed in all essential respects using 1.62 g. of octadecanol, 2.6 g. of TDI and 3.99 g. of Papi 901 (polymethylene polyphenylisocyanate) in place of hexadecanol, Hylene W and Mondur CB-75, respectively. A 1.0% aqueous mixture of the product has a viscosity of 19,400 cps which increases to 77,000 cps upon the addition of 0.5% Triton X-102 nonionic surfactant.

EXAMPLE 50

A mixture of 296.3 g. of PEG (molecular weight 7400 and eq. wt. 3700 by hydroxyl number), 8.1 of octadecanol, 400 g. of toluene and 0.4 g. of dibutyltin dilaurate was dried by azeotropic distillation. At 60° C., 7.83 g. of tolylene diisocyanate and 5.2 g. of "Desmodur N" were added. After 3 hours at 70° C. and 3 hours at 80° C., the polymeric reaction product was poured out to air dry. Table 7 below lists the foregoing reactants and others used to prepare polymers in essentially the same manner. Equivalent proportions are given in parentheses.

TABLE 7

| Ex. No. | Diol (eq.) | Monol (eq.) | Triisocyanate (eq.) | Diisocyanate (eq.) |
|---|---|---|---|---|
| 50 | PEG-7400 (4.0) | $C_{18}H_{37}$(1.5) | $C_{20}$ (1.0) | $C_7H_6$ (4.5) |
| 51 | PEG-7400 (3.3) | $C_{18}H_{37}$(1.75) | $C_{30}$ (1.0) | $C_7H_6$ (4.5) |
| 52 | PEG-7400 (4.0) | $C_{18}H_{37}$(2.0) | $C_{20}$ (1.1) | $C_7H_6$ (5.2) |
| 53 | PEG-7400 (3.3) | $C_{18}H_{37}$(2.0) | $C_{30}$ (1.1) | $C_7H_6$ (4.9) |
| 54 | PEG-7400 (3.3) | $C_{14}H_{29}$(1.75) | $C_{30}$ (1.0) | $C_7H_6$ (4.5) |
| 55 | PEG-7600 (9.0) | $C_{20}H_{41}$(1.0) | $C_{30}$ (1.0) | $C_7H_6$ (9.0) |
| 56 | PEG-7600 (9.0) | $C_{18}H_{37}$(1.0) | PAPI 135 (1.0) | $C_7H_6$ (9.0) |
| 57 | PEG-7600 (9.0) | $C_{18}H_{37}$(1.0) | PAPI 135 (2.0) | $C_7H_6$ (8.0) |
| 58 | PEG-7600 (9.0) | $C_{12}H_{25}$(1.0) | PAPI 135 (2.0) | $C_7H_6$ (8.0) |
| 59 | PEG-7600 (9.0) | $C_{12}H_{25}$(1.0) | PAPI 901 (4.0) | $C_7H_6$ (6.0) |
| 60 | PEG-7600 (9.0) | $C_{14}H_{29}$(1.0) | PAPI 901 (3.0) | $C_7H_6$ (7.0) |
| 61 | PEG-7600 (9.0) | $C_{10}H_{21}$(1.0) | PAPI 901 (4.0) | $C_{13}H_{10}$ (6.0) |
| 62 | PEG-7600 (9.0) | $C_{12}H_{25}$(1.0) | PAPI 901 (3.0) | $C_{13}H_{10}$ (7.0) |

EXAMPLES 63–67: REACTION PRODUCT VI

Trimethylolpropane-ethylene oxide adduct reacted with octadecyl isocyanate and diisocyanate

EXAMPLE 63

A mixture of 150 g. of a trimethylolpropane-ethylene oxide adduct of 9.7 hydroxyl number (eq. wt. 5800) and 200 g. of toluene was dried by azeotropic distillation. Then, 0.15 g. of dibutyltin dilaurate, 6.11 g. of octadecyl isocyanate and 3.09 of "DDI" was added at 60° C. After 5 days at 60° C., the polymeric product was isolated after the toluene evaporated from a slab mold. Table 8 below describes the foregoing and other reactants used to prepare polymers essentially as described with respect to Example 63. Reactant proportions in equivalents are given in parentheses.

TABLE 8

| Ex. No. | Triol (eq.) | Diisocyanate (eq.) | Monoisocyanate (eq.) |
|---|---|---|---|
| 63 | TMP.EO$_{132}$ (1.0) | $C_{36}$(0.4) | $C_{18}$(0.8) |
| 64 | TMP.EO$_{132}$ (1.0) | $C_{36}$(0.4) | $C_{12}$(0.8) |
| 65 | TMP.EO$_{142}$ (1.0) | $C_{36}$(0.4) | $C_8$ (0.8) |
| 66 | TMP.EO$_{116}$ (1.0) | $C_{36}$(0.4) | t-$C_{12}$(0.8) |
| 67 | TMP.EO$_{116}$ (1.0) | $C_{36}$(0.4) | t-$C_{18}$(0.8) |

EXAMPLES 68–73: REACTION PRODUCT VII

Monoisocyanate capped polymers from triisocyanate

EXAMPLE 68

A mixture of 150 g. of polyoxyethylene glycol (6000 molecular weight), 150 g. toluene and dibutyltin dilaurate catalyst was dried by azeotropic distillation. At 70° C., 5.93 g. of dodecyl isocyanate was added. After 2 hours at 70° C. isocyanate consumption was complete, and 4.49 g. of 75% Desmodur-N triisocyanate was added. The reaction mixture was held at 60° C. for 18 hours and then dried in a slab mold. Table 9 below lists the foregoing and other reactants used to prepare polymers in essentially the same manner. Proportions in equivalents are given in parentheses.

TABLE 9

| Ex. No. | Diol (eq.) | Triisocyanate (eq.) | MonoNCO (eq.) |
|---|---|---|---|
| 68 | PEG-6000 (1.0) | $C_{20}$ (0.4) | $C_{18}$ (0.7) |
| 69 | PEG-20,000 (1.0) | $C_{20}$ (0.4) | $C_{18}$ (0.7) |
| 70 | PEG-6000 (1.0) | $C_{20}$ (0.4) | $C_{12}$ (0.7) |
| 71 | PEG-20,000 (1.0) | $C_{20}$ (0.4) | $C_{12}$ (0.7) |
| 72 | PEG-6000 (1.0) | $C_{20}$ (0.4) | mix $C_{12}$ (0.35) $C_{18}$ (0.35) |
| 73 | PEG-20,000 (1.0) | $C_{20}$ (0.4) | mix $C_{12}$(0.35) $C_{18}$(0.35) |

EXAMPLES 74–77: REACTION PRODUCT VIII

Polybranched polymers from triol, monol and diisocyanate

Essentially as described in Examples 28–39, polymeric reaction products were prepared from the reactants and in the proportions (by equivalents) listed in Table 10 below.

TABLE 10

| Ex. No. | Triol (eq.) | Monol (eq.) | Diisocyanate (eq.) |
|---|---|---|---|
| 74 | TMP.EO$_{157}$ (1.0) | $C_{18}H_{37}$.EO$_{211}$ (1.25) | $C_7H_6$ (2.3) |
| 75 | TMP.EO$_{157}$ (1.0) | $C_{12}H_{25}$.EO$_{137}$ (1.25) | $C_7H_6$ (2.3) |
| 76 | TMP.EO$_{157}$ (1.0) | $C_{14}H_{29}$.EO$_{168}$ (1.25) | $C_7H_6$ (2.3) |
| 77 | TMP.EO$_{157}$ (1.0) | $C_{16}H_{33}$.EO$_{107}$ (1.25) | $C_7H_6$ (2.3) |

EXAMPLE 78—Pigment Print Paste

A clear concentrate is prepared by admixing the polyurethane of Example 30 with methanol and a surfactant, and then adding water, in the following proportions:

| | Wt. % |
|---|---|
| Ex. 30 polyurethane thickener | 25 |
| Triton X-102 nonionic | |

-continued

|  | Wt. % |
|---|---|
| surfactant | 17 |
| Methanol | 35 |
| Water | 23 |
|  | 100 |

The Triton X-102 surfactant is an octylphenyl/ethylene oxide condensate containing 12-13 ethylene oxide groups, sold by Rohm and Haas Company, Philadelphia. The clear concentrate has a viscosity of about 1500 cps. (Brookfield Viscometer, No. 4 spindle, 6 rpm.).

The clear concentrate is then blended with a commercial pigment presscake dispersion (about 50% Blackman-Uhler BU-Aqua Hue Blue BGG-9521 pigment, balance dispersants and water) and water in the following proportions to form a creamy, color concentrate having a viscosity of about 5,000 cps.:

|  | Wt. % |
|---|---|
| Clear concentrate | 18.0 |
| Pigment dispersion | 45.2 |
| Water | 36.8 |
|  | 100.0 |

The final print paste is formed by blending 10% of the foregoing color concentrate, 10% of a polymeric binder (Rhoplex E-32 acrylic polymer emulsion, 46.0% solids), 5% of the clear concentrate and the balance water (to make 100%). The resultant composition has a viscosity of about 40,000 cps. and gives sharp, non-haloing colors when screen printed onto various fabrics, including cotton, polyester and cotton-polyester blends.

EXAMPLE 79—Acid Dye Print Paste

Creamy acid dye print pastes (pH 2.0-2.3) are prepared essentially as described in Example 78 except for an acid dye in place of the pigment dispersion and absence of polymeric binder, according to the following formulation:

|  | % |
|---|---|
| Clear Concentrate (Ex. 78) | 3-6 |
| Acid Blue −25[1] | 0.375 |
| Formic Acid | 1.8 |
| Antifoam agent[2] | 0.2 |
| Water to make | 100 |

[1]Tectilon Blue GRL - Ciba Geigy Corporation
[2]Foam Master DF-160L - Nopco Chemical Corp.

The viscosity is easily controlled by the thickener system of the clear concentrate:

| Clear Concentrate (%) | Viscosity (cps., LVF Brookfield) |
|---|---|
| 3.0 | 100 |
| 3.5 | 950 |
| 4.0 | 450 |
| 5.0 | 2800 |
| 6.0 | 1400 |

The pastes are applied to carpets using conventional carpet printing machines such as a Zimmer Flat Bed Screen and provide excellent printability. The thickener system holds the dyestuff during the printing operation but permits the dyestuff to be released during fixation such that the dye diffuses rapidly into the yarn and the resulting color has good penetration and brightness.

EXAMPLES 80-82

Following are additional acid dye print pastes prepared essentially as described in Example 79 except for a different polyurethane thickener. The pastes give excellent, non-haloing prints on carpets.

| Ex. | [1]Clear Concentrate (%) | Dye (%) | Formic Acid (%) | [5]Antifoam (%) | [6]Viscosity (cps.) |
|---|---|---|---|---|---|
| 80 | 4.0 | [2]Acid Blue −40 1.0 | 1.8 | .2 | 7,500 |
| 81 | 4.0 | [3]Acid Red −57 0.75 | 1.8 | .2 | 1,500 |
| 82 | 4.0 | [4]Acid Red −151 1.0 | 1.8 | .2 | 2,000 |

[1] Clear concentrate formulation:

| Thickener of Ex. 29 | 25% |
|---|---|
| Triton X-102 surfactant | 17 |
| Methanol | 35 |
| Water | 23 |
|  | 100% |

[2]Acid Blue −40: Merpacyl Blue 2GA (Du Pont)
[3] Acid Blue − 57: Atlantic Acid Rubine, 3GP (Atlantic Chemical Corp.)
[4]Acid Red −151: Merpacyl Red L (Du Pont)
[5]Foam Master DF-160L (Nopco Co.)
[6]Brookfield, LVF

EXAMPLES 83-89

Table 11 below summarizes viscosities of pigment color concentrates and color cuts prepared and tested essentially as described in Example 78 except for variations in polyurethane thickeners and concentrations. Table 11 also summarizes viscosities of acid dye print pastes prepared and tested essentially as described in Example 79 except for different polyurethane thickeners and/or concentrations. The formulations illustrate the substantial variations in viscosity resulting from differences in polyurethane composition and concentration, and even in dyestuff concentration.

TABLE 11

|  | EXAMPLE | | | | | | |
|---|---|---|---|---|---|---|---|
|  | 83 | 84 | 85 | 86 | 87 | 88 | 89 |
| Polyurethane Thickener, Ex. No. | 28 | 29 | 30 | 40 | 47 | 48 | 49 |
| Pigment Color Concentrate | | | | | | | |
| Clear Concentrate (%) | 4.0 | 5.0 | 6.0 | 10 | 4 | 1.0 | 1.0 |
| Presscake Dispersion (%) | 50 | 45.2 | 50 | 43 | 50 | 50 | 50 |
| Viscosity (cps.) | 2500 | 2700 | 3500 | — | 1900 | 6100 | 6000 |
| Pigment Color Cut (10%) | | | | | | | |
| Clear Concentrate (%) | 4.0 | 3.0 | 3.0 | 6.0 | 4.5 | 2.5 | 2.5 |
| Color Concentrate (%) | 10 | 10 | 10 | 10 | 10 | 10 | 10 |
| Binder (%) | 10 | 10 | 10 | 10 | 10 | 10 | 10 |
| Viscosity (cps) | 33000 | 25000 | 22000 | 30700 | 5800 | 20000 | 19700 |
| Acid Dye Pastes | | | | | | | |

TABLE 11-continued

| | EXAMPLE | | | | | | |
|---|---|---|---|---|---|---|---|
| | 83 | 84 | 85 | 86 | 87 | 88 | 89 |
| Polyurethane Thickener, Ex. No. | 28 | 29 | 30 | 40 | 47 | 48 | 49 |
| Clear Concentrate (%) | 4.0 | 4.0 | 4.0 | — | — | 4.0 | 4.0 |
| Viscosity (cps.) at % | | | | | | | |
| acid dye[1] levels of: 0.3 | 700 | 3700 | 1700 | — | — | 23800 | 23000 |
| 0.75 | <100 | 350 | 450 | — | — | 50600 | 2200 |
| 1.5 | <100 | 200 | 450 | — | — | 22000 | 100 |

[1]Acid Blue −25 (Tectilon Blue GRL - Ciba-Geigy Corp.)

We claim:

1. A clear concentrate composition for use in print pastes, comprising a mixture of about 5–50% by weight of (1) a primary thickener comprising a nonionic water soluble or water solulizable polyurethane, (2) a surfactant cothickener different from (1), in an amount providing a weight ratio of (1) to (2) of about 1:0.01 to about 1:10, (3) about 5–35% by weight of a non-aqueous, inert organic diluent, and (4) 0 to about 65% by weight of water, said polyurethane having a molecular weight of at least 10,000 and at least three hydrophobic branching groups, the hydrophobic groups containing a total of at least 20 carbon atoms and being linked through hydrophilic polyether segments of at least 1500 molecular weight each; wherein the polyurethane thickener is selected from the following reaction products wherein reactant (a) is at least one water soluble polyether polyol containing at least three hydroxyl groups, reactant (b) is at least one water insoluble organic diisocyanate, reactant (c) is at least one water insoluble organic polyisocyanate containing at least three isocyanate groups, reactant (d) is at least one hydrophobic organic monofunctional active hydrogen compound, reactant (e) is at least one hydrophobic organic monoisocyanate, and reactant (f) is at least one polyhydric alcohol or polyhydric alcohol ether containing three or more hydroxyl groups:

(I) reaction products of reactant (a) and (e),
(II) reaction products of reactants (a), (c) and (d),
(III) reaction products of reactants (a), (b), (d) and (f),
(IV) reaction products of reactants (a), (b), (e) and (f),
(V) reaction products of reactants (a), (b), (c) and (d),
(VI) reaction products of reactants (b), (e) and (f),
(VII) reaction products of reactants (a), (c) and (e),
(VIII) reaction products of reactants (b), (d) and (f).

2. A concentrate as in claim 1 wherein the surfactant cothickener is a nonionic or anionic surfactant and the primary thickener to surfactant cothickener weight ratio is about 1:0.05 to about 1:5.

3. A concentrate as in claim 1 wherein the polyurethane thickener is selected from a trimethylol propane/ethylene oxide adduct capped with octyldecyl isocyanate, a dipentaerythritol/ethylene oxide adduct capped with octyldecyl isocyanate, a trimethylol propane/ethylene oxide adduct reacted with a tolylene diisocyanate polyethylene glycol condensate and capped with octadecanol, a trimethylol propane/ethylene oxide/$C_{36}$ dimer acid diisocyanate/polyethylene glycol condensate capped with octadecyl isocyanate, a polyethylene glycol/4,4′-methylenebis(isocyanatocyclohexane)/triisocyanate adduct of trimethylol propane and tolylene diisocyanate capped with hexadecanol, a polyethylene glycol/methylenedi-p-phenylene diisocyanate/triisocyanate adduct of trimethylol propane and tolylene diisocyanate condensate capped with eicosanol, a polyethylene glycol/tolylene diisocyanate/polymethylene polyphenylisocyanate condensate capped with octadecanol, a polyethylene glycol/trimethylol propane/tolylene diisocyanate condensate capped with octadecanol, a polyethylene glycol/tolylene diisocyanate/dipentaerythritol condensate capped with octadecanol, and a polyethylene glycol/trimethylol propane/tolylene diisocyanate condensate capped with perfluorododecanol.

4. A concentrate as in claim 1 wherein the diluent is a water soluble alcohol, glycol, alcohol ether, ketone, ester, or any mixture of two or more thereof.

5. A print paste comprising a mixture of about 0.1–20% by weight of the clear concentrate of claim 1, about 0.1–20% by weight of a dyestuff, and water to make 100% by weight.

6. A print paste as in claim 5 wherein said dyestuff is a pigment, an acid dye or a cationic dye, and said paste additionally contains about 0.1–20% by weight of a binder when said dyestuff is a pigment.

7. A print paste comprising a mixture of about 0.1–20% by weight of the clear concentrate of claim 3, about 0.1–20% by weight of a dyestuff, and water to make 100% by weight.

8. A print paste as in claim 7 wherein said dyestuff is a pigment, an acid dye or a cationic dye, and said paste additionally contains about 0.1–20% by weight of a binder when said dyestuff is a pigment.

9. A method of preparing a print paste, comprising the steps of:
(a) forming the clear concentrate of claim 1, and
(b) admixing said clear concentrate with a dyestuff and sufficient water to obtain a viscosity of from about 500 to about 50,000 cps.

10. A method of preparing a print paste, comprising the steps of:
(a) forming the clear concentrate of claim 1,
(b) forming a color concentrate by admixing a first portion of said clear concentrate with a pigment, and
(c) admixing a second portion of said clear concentrate with said color concentrate and sufficient water to obtain a viscosity of from about 1,000 to about 50,000 cps.

11. A method of preparing a print paste, comprising the steps of:
(a) forming the clear concentrate of claim 1, and
(b) admixing said clear concentrate with an acid or cationic dye and sufficient water to obtain a viscosity of about 500–20,000 cps.

12. A method of printing, comprising the steps of:
(a) forming the print paste as in claim 5, and
(b) applying said print paste to a fibrous material.

13. A coloring composition comprising an aqueous mixture of (1) a water soluble dyestuff, about 0.01–5% by weight of (2) a primary thickener comprising a nonionic water soluble or water solulizable polyurethane, and (3) a surfactant cothickener different from (2), in an amount providing a weight ratio of (2) to (3) of about 1:0.01 to about 1:10, said polyurethane thickener having a molecular weight of at least 10,000 and at least three hydrophobic branching groups, the hydrophobic groups containing a total of at least 20 carbon atoms and being linked through hydrophilic segments of at least 1500 molecular weight each; wherein the polyurethane thickener is selected from the following reaction products wherein reactant (a) is at least one water soluble polyether polyol containing at least three hydroxyl groups, reactant (b) is at least one water insoluble organic diisocyanate, reactant (c) is at least one water insoluble organic polyisocyanate containing at least three isocyanate groups, reactant (d) is at least one hydrophobic organic monofunctional active hydrogen compound, reactant (e) is at least one hydrophobic organic monoisocyanate, and reactant (f) is at least one polyhydric alcohol or polyhydric alcohol ether containing three or more hydroxyl groups:

(I) reaction products of reactant (a) and (e),
(II) reaction products of reactants (a), (c) and (d),
(III) reaction products of reactants (a), (b), (d) and (f),
(IV) reaction products of reactants (a), (b), (e) and (f),
(V) reaction products of reactants (a), (b), (c) and (d),
(VI) reaction products of reactants (b), (e) and (f),
(VII) reaction products of reactants (a), (c) and (e),
(VIII) reaction products of reactants (b), (d) and (f).

14. A coloring composition as in claim 13 wherein the surfactant cothickener is a nonionic or anionic surfactant and the primary thickener to surfactant cothickener weight ratio is about 1:0.05 to about 1:5.

15. A print paste as in claim 5 wherein the polyurethane thickener is selected from a trimethylol propane/ethylene oxide adduct capped with octyldecyl isocyanate, a dipentaerythritol/ethylene oxide adduct capped with octyldecyl isocyanate, a trimethylol propane/ethylene oxide adduct reacted with a tolylene diisocyanate polyethylene glycol condensate and capped with octadecanol, a trimethylol propane/ethylene oxide/$C_{36}$ dimer acid diisocyanate/polyethylene glycol condensate capped with octadecyl isocyanate, a polyethylene glycol/4,4'-methylenebis(isocyanatocyclohexane) triisocyanate adduct of trimethylol propane and tolylene diisocyanate capped with hexadecanol, a polyethylene glycol/methylene di-p-phenylene diisocyanate/triisocyanate adduct of trimethylol propane and tolylene diisocyanate condensate capped with eicosanol, a polyethylene glycol/tolylene diisocyanate/polymethylene polyphenylisocyanate condensate capped with octadecanol, a polyethylene glycol/trimethylol propane/tolylene diisocyanate condensate capped with octadecanol, a polyethylene glycol/tolylene diisocyanate/dipentaerythritol condensate capped with octadecanol, and a polyethylene glycol/trimethylol propane/tolylene diisocyanate condensate capped with perfluorododecanol.

16. A coloring composition as in claim 13 wherein the dyestuff is a pigment, an acid dye or a cationic dye.

* * * * *